INVENTORS
James R. Biard
Jerry D. Merryman

BY

ATTORNEY

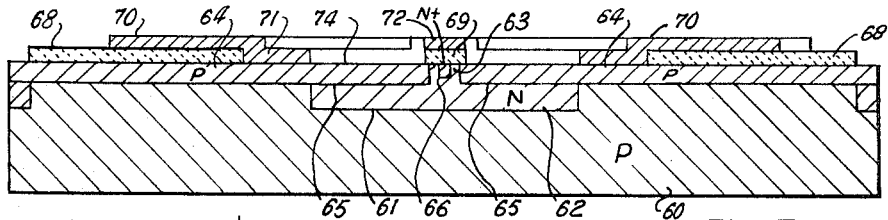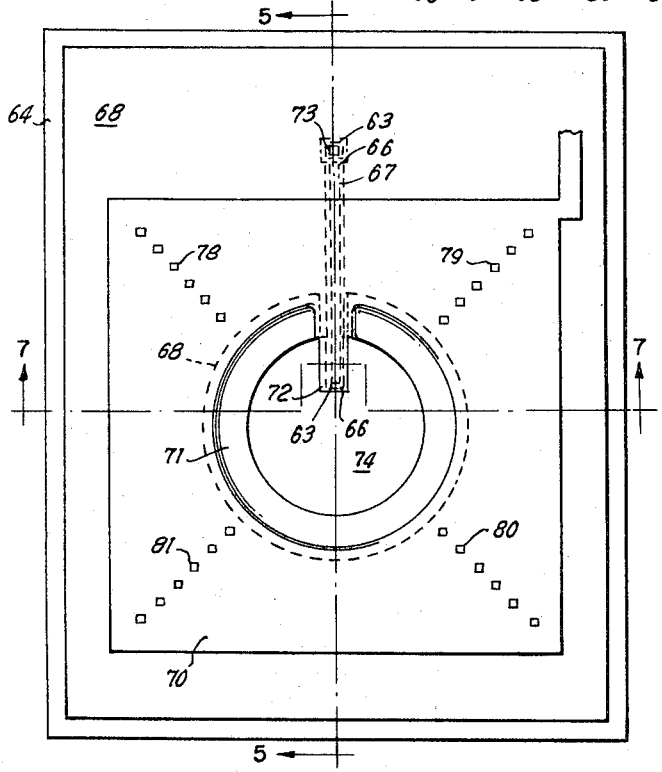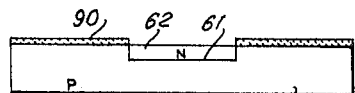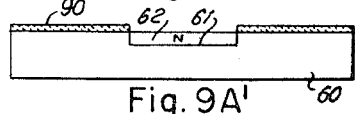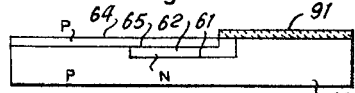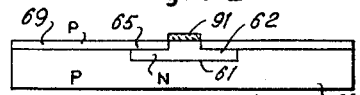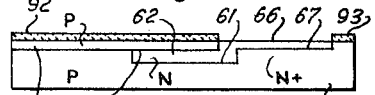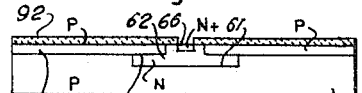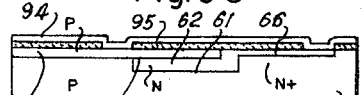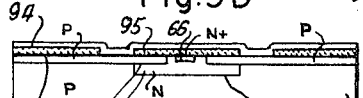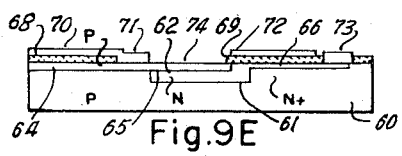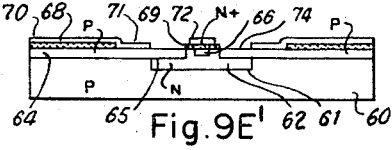

United States Patent Office
3,436,548
Patented Apr. 1, 1969

3,436,548
COMBINATION P-N JUNCTION LIGHT EMITTER
AND PHOTOCELL HAVING ELECTROSTATIC
SHIELDING
James R. Biard, Richardson, and Jerry D. Merryman,
Dallas, Tex., assignors to Texas Instruments Incorporated, Dallas, Tex., a corporation of Delaware
Filed June 29, 1964, Ser. No. 379,443
Int. Cl. H01j 39/12
U.S. Cl. 250—211                    15 Claims

ABSTRACT OF THE DISCLOSURE

An opto-electronic device for transmitting electronic signals through the use of a semiconductor light source and a photosensitive semiconductor detector, the detector being constructed to provide electrostatic shielding to prevent the occurrence of signal disruptive distributed capacitance between the light source and the detector.

---

This invention relates generally to semiconductor devices, and more particularly to a system for optically coupling an electrical signal between a solid-state semiconductor light source and a solid-state semiconductor photosensitive detector, wherein the light source and detector are electrically isolated by means of the utilization of optical radiation and the electrostatic shielding of the detector, the latter of which precludes capacitive coupling of electrical signals between the light source and detector.

A considerable emphasis is presently being placed on the development and use of solid-state, optoelectronics, wherein electrical signals are coupled between various circuits by means of optical radiation. This particular branch of technology has great usefulness in its application to semiconductor integrated networks to provide a greater flexibility in design, with the advantages achieved in the use of optoelectronics being many fold. For example, one distinct advantage of coupling signals between circuits with optical radiation is the electrical isolation achieved between circuits, thus making possible the independence of the coupled circuits with respect to the use of different supplies or potential levels. Optical coupling between circuits, because of its electrical isolation feature, supplies the need for the equivalent of a transformer in coupling AC signals. This is a distinct advantage in solid-state integrated circuits since conventional transformers cannot be fabricated within such a network. Moreover, the use of optical coupling is superior to a conventional transformer in that both AC and DC signals can be coupled, whereas only AC signals can be coupled between the primary and secondary of a transformer. There are many other advantages and features of optical coupling techniques, some of which are described in the copending application of Biard et al., entitled, Electro-Optical Coupling Device, Ser. No. 327,136, filed Nov. 29, 1963, and assigned to the common assignee.

The utilization of optoelectronics requires the use of a solid-state light source and a solid-state photosensitive device optically coupled to the light source, the latter of which produces an electrical signal or current whose magnitude is proportional to the intensity of the optical radiation incident thereon. As described in the copending Biard et al., application, the preferred embodiment of the light source is a semiconductor diode comprised of a suitable semiconductor material which produces or generates optical radiation in response to a forward current flow across the junction thereof. The preferred embodiment of the photosensitive detector is a semiconductor junction device, which is either a diode having a single junction, or a device having multiple junctions in which the particular wavelength of light generated by the light source is absorbed within the detector near the active junction or junctions. The optical radiation or photons of light generate hole-electron pairs, and these carriers are collected at the junction or junctions of the detector to produce a photocurrent. It has been found that an excellent combination of light source and detector is a gallium-arsenide p-n diode used as the light source and a silicon diode used as the detector, with many variations in the constituents of these materials being possible, all as described in the above copending Biard et al. application.

It will be recognized that some consideration must be given to the overall efficiency of optoelectronic techniques, wherein a considerable loss of light generated by the light source before it is utilized at the junction or junctions of the detector is undersirable. For this reason, serious considerations must be given to the techniques for optically coupling the light source to the detector, wherein essentially complete electrical isolation between the two must be maintained. An obvious way to minimize light loss between the light source and the detector is to situate the light source in very close proximity to the detector, with suitable electrical isolation means separating the two which is transparent to the optical radiation generated. Because of the miniature size of the network, the light source will necessarily be situated in close proximity to the detector when the devices are fabricated within or used in conjunction with a semiconductor integrated network. This light transmitting medium can take the form of air, glass of various compositions and other mediums known in the art. However, the fact that the light source and the detector are situated in very close proximity presents serious problems in the overall operation of the combination of light source and diode as an optical coupling means in that complete electrical isolation between the two is not achieved. As noted earlier, one of the distinct advantages of optoelectronic techniques is the fact that both AC and DC signals can be coupled by means of the optical radiation, wherein it is desirable in many cases to couple very high frequency signals between the two. If the light source and the detector are sufficiently close to each other that distributive capacitance exists therebetween, a considerable amount of capacitive coupling of undesirable high frequency electrical signals will result. This is undesirable since the circuit within which the light source is connected normally contains undesirable ground currents and other spurious signals of frequencies in the same frequency range as the true signal but unrelated thereto which can be coupled into the circuit within which the detector is connected. Thus it becomes apparent that the degree of electrical isolation between the two circuits which are optically coupled is not necessarily achieved in the presence of the distributive capacitance existing between the two devices. The elimination of this capacitance while yet maintaining the two devices in close proximity results in the transfer of only the desired signals from one circuit to the other by means of the optical radiation. The solution of this problem can be stated as a broad object of this invention.

To more clearly define the problem with which the present invention is concerned, it can be generally stated that serious problems exist in the reliability of some complex electronic systems when essentially complete electrical isolation can not be achieved between various subcircuits of the system, such as is the case of complex electronic missile systems. In such systems, which contain many subcircuits each having it own signal ground potential level, the interconnection of all of these so-called signal ground potentials together results in the transfer from one circuit to the next of undesirable ground currents. These circulating ground currents and other undesirable spurious signals result from the large number of signals being rapidly switched between various circuits, with the circulating ground currents normally being in the same frequency range as the true signals, but being unrelated thereto insofar as being useful or forming a part of the signal. The transfer or coupling of circulating ground currents from one circuit to the signal ground potential of another circuit can result in the undesirable signal being superimposed on the true signal should the circuit be sensitive enough to small signals, which is often the case. In conventional electronics, an actual physical connection between adjacent circuits is necessary to effect the transfer of the desired signal therebetween. Stated otherwise, the two circuits, conventionally, are referred to the same reference potential source and this is the cause of the problem. However, essentially complete electrical isolation means for coupling electrical signals obviates this problem, and is achieved through the use of the optical coupling device of this invention.

The present invention provides a semiconductor junction detector device responsive to optical radiation, such as generated by a solid-state light source, in which the active junction or junctions of the detector are electrostatically shielded from any signals capacitively coupled thereto and are responsive only to the signal transferred by the optical radiation. This is accomplished by the essentially complete enclosure of one of the active regions of the semiconductor detector junction within the detector. More specifically, the detector, in its preferred embodiment, takes the form of a semiconductor junction diode wherein one of the active regions of the diode is virtually, if not completely, surrounded by the other region of the diode. This of course, results in the enclosure of the active junction of the diode. The use of optical coupling techniques eliminates the transfer of undesirable ground currents from the signal ground portion of the circuit containing the light source to the signal ground portion of the circuit containing the detector, since only a small distributive capacitance exists therebetween. This capacitance is small enough to pose a substantial impedance to AC current flow which would otherwise be sufficiently large to affect the signal portion of the detector circuit should the signal grounds of the two circuits be electrically shorted. However, a small distributive capacitance also exists between the signal ground of the light source circuit and the signal portion of the detector circuit. Even a small capacitance here can be large enough ot effect the transfer of undesirable signals which can be substantial relative to the true signal for very sensitive circuits. To solve this problem the active detector region is enclosed in an electrostatic shield in the present invention with the shield being connected to the signal ground of the detector circuit, so that all undesirable signals are passed through the relatively high impedance, small capacitance existing between the signal grounds of the two circuits. This provides essentially complete electrical isolation between adjacent circuits with only the desired signal being transferred by the optical radiation, all as will be described in the following description of a preferred embodiment of the invention.

Other objects, features and advantages of the invention will become apparent from the following detailed description of a preferred embodiment thereof when taken in conjunction with the appended claims and the attached drawing wherein like reference numerals refer to like parts throughout the several figures, and in which:

FIGURE 7 is another elevational view in section of the detector shown in FIGURE 4 taken across section lines 7—7 thereof;

FIGURE 8 is a plan view of the detector shown in FIGURE 4; and

FIGURES 9-A, A' through 9-E, E' are elevational views in section of the detector illustrating the various stages during the fabrication thereof.

Figure 1:
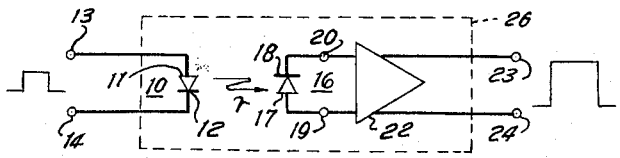
FIGURE 1 is a schematic diagram illustrating the general application of optoelectronics showing a solid-state semiconductor light source optically coupled to a solid-state semiconductor photosensitive detector.

A general illustration of the application of optoelectronics to electronic circuitry is shown in the schematic diagram of FIGURE 1, wherein a solid-state semiconductor light source 10 is optically coupled to a solid-state semiconductor photosensitive detector 16. The light source 10 is preferably a semiconductor junction diode having an anode 11 and cathode 12 connected to input terminals 13 and 14, respectively, and is comprised of a suitable semiconductor composition, such as gallium-arsenide, for example, for generating the desired wavelength of optical radiation, such as described in the above-noted copending Biard et al. application. The detector is also shown to be a semiconductor junction diode having an anode 17 and cathode 18 connected to terminals 19 and 20, respectively, wherein the composition of the semiconductor junction diode and the junction location therein is such as to absorb a majority of the particular wavelength of optical radiation generated by the light source within a diffusion length of minority carriers from the active junction of the device. The light source 10 generates optical radiation in response to an electric current flow across the junction in a forward direction, wherein the wavelength of the radiation is determined by the composition of the light source. The optical radiation, when absorbed within the detector 16, generates hole-electron pairs which are collected at the active junction of the detector to produce a photocurrent. The detector is connected through terminals 19 and 20 to a circuit 22 which responds to the photocurrent to perform a desired operation or function. The circuit 22 acts as the electrical load into which the detector is connected and can be of any variety of circuits. One example of a circuit which is desirably driven by a photocurrent generating detector device of this type is the very sensitive wide band DC amplifier described in the copending application of Jerry D. Merryman entitled Optoelectronic Circuitry, Serial No. 379,755, filed concurrently herewith and assigned to the same assignee. Such a circuit is an excellent example of one which is sufficiently sensitive that circulating ground currents existing in the light source circuit must be virtually eliminated in all portions of the detector circuit. The output of circuit 22 is across output terminals 23 and 24, and the light source 10 need not be referred to the same reference potential as any of the circuit containing the circuit 22 or detector 16 because of the electrical isolation achieved by use of the optical coupling technique. The entire system can be fabricated within a single network, such as, for example, an integrated network schematically shown by the dashed enclosure 26 and described in the above Jerry D. Merryman application. As pointed out in the introduction, all of the advantages of complete electrical isolation are achieved by this arrangement, which also yields infinite common mode rejection of undesirable signals present in the circuit containing the light source by essentially eliminating capacitive coupling between the light source circuit and the signal portion of the detector circuit.

Figure 2:
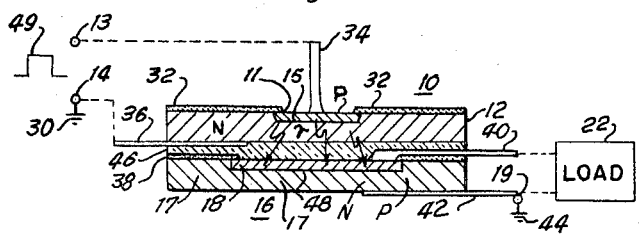
FIGURE 2 is an elevational view of a solid-state light source optically coupled to a solid-state photosensitive detector in close proximity thereto, illustrating the problem of the distributive capacitance existing between the light source and the detector.

Referring now to FIGURE 2 which illustrates the problem of maintaining complete electrical isolation between the light source and detector, a light source 10 is optically coupled to a detector 16 in close proximity thereto and separated by an optically transparent medium 46. The light source is preferably a semiconductor junction diode comprising a cathode region 12 which is a semiconductor wafer of a first electrical conductivity type, shown as n-type conductivity in this case, into which a p-type conductivity determining impurity is diffused to form an anode region 11 separated from the wafer by active junction 15. The diode light surce is shown to be of planar construction and has an oxide layer 32 formed on one surface thereof to protect the junction 15 where it intersects this surface. Electrodes 34 and 36 are attached to the anode and cathode regions, respectively, and are connected to input terminals 13 and 14. Situated immediately below the light source is a detector 16, which is also a semiconductor junction diode comprising an anode 17 consisting of a semiconductor wafer shown to be p-type conductivity into which an n-type conductivity determining impurity is diffused to form a cathode 18, the latter of which is separated from the wafer by an active junction 48. The detector is also of planar construction with an oxide layer 38 formed on the top surface thereof covering the junction 48 where it intersects this surface. The detector is separated from the light source by an optically transparent medium 46 to electrically isolate the light source from the detector, but which acts as a medium for transmitting the optical radiation to the detector. Electrodes 40 and 42 are attached to the cathode and the anode, respectively, and are connected to a load 22 such as circuit 22 of FIGURE 1. It is desirable that the light source and detector be positioned in close proximity to each other to minimize the loss of the optical radiation being transmitted from the light source to the detector, which losses would be considerable should the separation be great due to absorption, reflections and other effects. When an electrical pulse 49 is applied to the input terminals 13 and 14 to cause a current to flow in the forward direction across the junction 15 of light source 10, optical radiation is generated which is transmitted through the transparent layer 46 into the detector and is absorbed at or near the active junction 48. Upon absorption, the optical radiation generates hole-electron pairs which migrate toward the active junction to cause a photocurrent to flow through the terminals 40 and 42 to produce an input signal to the load 22. The input terminal 14 is normally connected to some reference potential, such as designated by ground 30, for example, and, similarly, one of the output terminals from the detector 42, such as terminal 19, for example, is connected to another reference potential, also designated as signal ground 44. Actually, the two grounds 30 and 44 can be different and each may be any reference potential completely independent of the other and in no way commonly connected electrically. This is possible and often desirable because of the electrical isolation made possible by the utilization of optoelectronic effects. Moreover, the term ground potential is used in its broadest sense and includes any reference potential which may be ground relative to the signal portion of the circuit, such as designated by the term signal ground. Because of the close spacing between the light source and the detector, however, a distributive capacitance exists which couples undesirable electrical signals from the circuit into which the light source is connected to the circuit into which the detector is connected.

Figure 3:
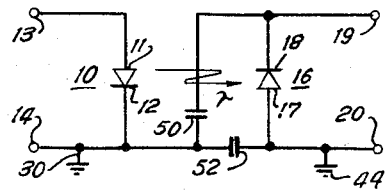
FIGURE 3 is an electrical schematic diagram of the equivalent circuit of the light source and detector of FIGURE 2.

An equivalent circuit of the combination of the two devices of FIGURE 2 is shown in the electrical schematic diagram of FIGURE 3 wherein, to further illustrate the distributive capacitance therebetween, a first distributive capacitance 50 exists between the cathode 12 of the light source and the cathode 18 of the detector, and a second distributive capacitance 52 exists between the cathode 12 of the light source and the anode 17 of the detector. The existence of the distributive capacitance can be more readily visualized from FIGURE 2, wherein the cathode or n-type region 12 of the light source is in close proximity to both the cathode 18 and anode 17 of the detector. The magnitude of capacitance 50 is typically in the order of 1 picofarad, whereas capacitance 52 is in the order of about 4 picofarads, the latter being larger because of the larger area of the cathode region 12 of the light source as compared to the area of the cathode 18 of the detector. Because of the relatively small magnitude of capacitance 52, a relatively large impedance is opposed to the coupling of circulating ground currents from signal ground 30 of the light source circuit to the signal ground 44 of the detector circuit insofar as its affecting the signal portion of the detector circuit. Thus the distributive capacitance 52 does not pose a problem to the achievement of adequate electrical isolation between the two circuits, even for the case where load circuit 22 is very sensitive such as described in the above-noted Merryman copending application. However, a distributive capacitance of even as much as 1 picofarad existing between cathode 12 of the light source and cathode 18 of the detector can substantially affect the true signal transmitted by the optical radiation. This is especially true for very sensitive circuits. Thus the problem solved by the invention, as set forth in the following description, is the elimination of the distributive capacitance 50, or the reduction of its magnitude to a negligible value.

Figure 5:
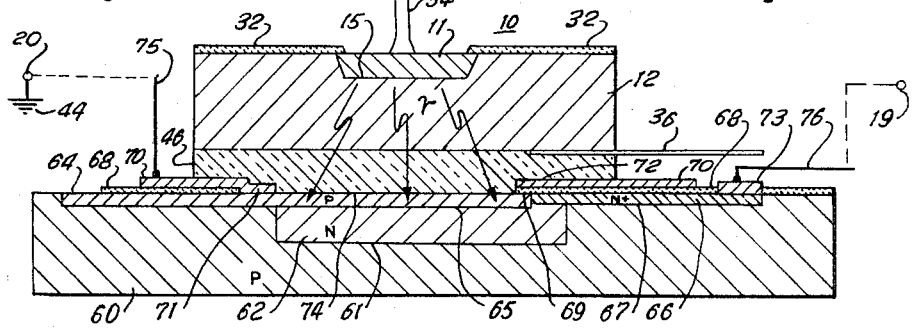
FIGURE 5 is an elevational view in section, taken across lines 5—5, of the embodiment of the electrostatically shielded detector of FIGURE 4, including a solid-state light source optically coupled thereto.

The invention eliminates, for all practical purposes, the distributive capacitance 50 between the signal ground of the light source circuit and the signal portion of the detector circuit by electrostatically shielding the active junction of the detector from the light source. A preferred embodiment of the invention is shown in the perspective view, including a section in elevation thereof, of FIGURE 4. Reference is also had to FIGURE 5, which is an elevational view in section taken across section lines 5—5 of FIGURE 4. FIGURE 5 also shows the light source in conjunction with the detector. The light source is of the same configuration and construction as described with reference to FIGURE 2, whereas the detector diode takes on an entirely different construction. Again, a semiconductor wafer 60 of one conductivity type, which is shown as p-type conductivity, has diffused into one surface thereof an impurity which determines the opposite conductivity type which is n-type conductivity in this case, to form the cathode region 62 separated from the wafer or anode by an active junction 61. The exact process by which the various regions of the detector device are formed will be described later in conjunction with FIGURES 9A–9E, but for the present, the actual physical construction of the diode will be described without detailed reference to the process. The n-type region 62 or cathode is preferably of a circular configuration and after it is formed, a p-type conductivity determining impurity is diffused into the same surface to form a p-type region 64 which extends over most of the original wafer 60 and over almost the entire surface of the n-type region 62. During the diffusion of this p-type impurity, however, a narrow strip extending over portions of the n-type region 62 and the p-type wafer 60 is masked against the diffusion so that a narrow channel region 63 (see FIGURES 4 and 7) is left beneath the strip and remains n-type conductivity in the n-type region 62 and is p-type conductivity of the same resistivity as the original wafer in the portion underlying the strip which extends over the original wafer. The n-type region 62 is more heavily doped than the original wafer when formed by diffusion so that the original p-type wafer will be converted to n-type conductivity in region 62. Similarly, the region 64 is more heavily doped than either the original wafer or the region 62 to convert the layer 64 overlying region 62 to p-type conductivity. Subsequently, an n-type conductivity determining impurity is selectively diffused into the channel region 63 to form a narrower n-type channel region 66 which is located within channel region 63 but which is more heavily doped than region 63 and is of lower resistivity, thus being designated as an n+ region. Region 66 is more heavily doped in order to convert the p-type portion of channel region 63 to n-type conductivity and to form a rectifying junction 67 therewith. It can be seen at this stage that the n-type cathode region 62 is enclosed within and surrounded by the p-type conductivity anode region comprised of the original wafer 60 and region 64, with the exception of the narrow channel region 63, wherein a rectifying junction 65 is formed between regions 64 and 62 and rectifying junction 61 is formed between regions 60 and 62. No rectifying junction is formed, of course, between the p-type region 64 and the original p-type wafer 60. Similarly, no rectifying junction is formed between n regions 66 and region 62, so that the channel 66 establishes an electrical connection to the buried cathode 62. However, a rectifying junction 67 does exist between n+ type channel 66 and the original p-type wafer to prevent shorting of the anode to the cathode. An oxide layer 68 is formed over the entire wafer, and subsequently, a circular central portion is removed which exposes a portion of the p-type layer 64 which overlies the n-type region 62 and an annular portion of p-type layer 64 surrounding region 62, except for a tab portion 69 of the oxide layer which is left intact covering and overlapping the channel region 63 which extends in n-type region 62. Subsequently, an electrode 70 is formed on top of the oxide and overlaps it in the annular exposed portion of layer 64 surrounding n-type region 62 to make contact to the p-type region 64. The electrode 70 also extends over the narrow channel region 63 into the central opening and forms a tab portion 72 covering and overlapping region 63. An electrode 73 is also formed or deposited onto the extreme end of the n+ region 66 which extends beyond electrode 70 with the same oxide layer being formed around this electrode. Because of the thinness of the oxide layer 68, the boundaries of the channel regions 63 and 66 extending beyond electrode 70 can be seen therebeneath. It will be noted that the outer boundaries of channels 63 and 66 are separated in order to reduce any distributive capacitance that exists between the p-type region 64 and n+ channel region 66. That is to say, the outer boundary of channel 66 abuts and forms a rectifying junction 67 with the p-type portion of channel 63 and the original wafer 60 at the bottom of channel 66, but is separated from the more heavily doped p-type region 64. It is well known that the heavier the doping level on opposite sides of a rectifying junction, the greater the capacitance of the junction. Thus a relatively small distributive capacitance results from the junction 67 between channel 66 and the p-type portion of channel 63, including wafer 60, as compared to the capacitance that would result in forming a rectifying junction between the n+ channel 66 and the heavily doped p-type region 64.

The n-type region 62 is now essentially surrounded and enclosed by the p-type regions comprised of the original wafer 60 and the p region 64 with the exception of the narrow channel 66, which is used to make electrical contact to the cathode 62. The tab portion 72 of electrode 70 overlies the channel region 63, and also channel 66, so as to electrostatically shield this portion. Leads 75 and 76 are then connected to the electrodes 70 and electrodes 73, respectively, wherein lead 75 makes the connection to the anode of the detector and is connected to terminal 20 or signal ground 44. Lead 76 is connected to the other output terminal 19, which is the signal portion of the detector circuit. Thus, all of the p-type regions surrounding the cathode are referenced to signal ground 44, including electrode 70, and act as an electrostatic shield about the cathode.

Figure 6:
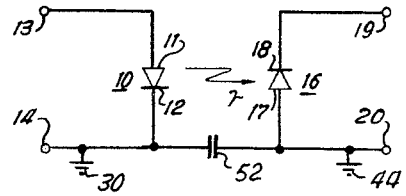
FIGURE 6 is an electrical schematic diagram of the equivalent circuit of the device of FIGURE 5.
Figure 4:
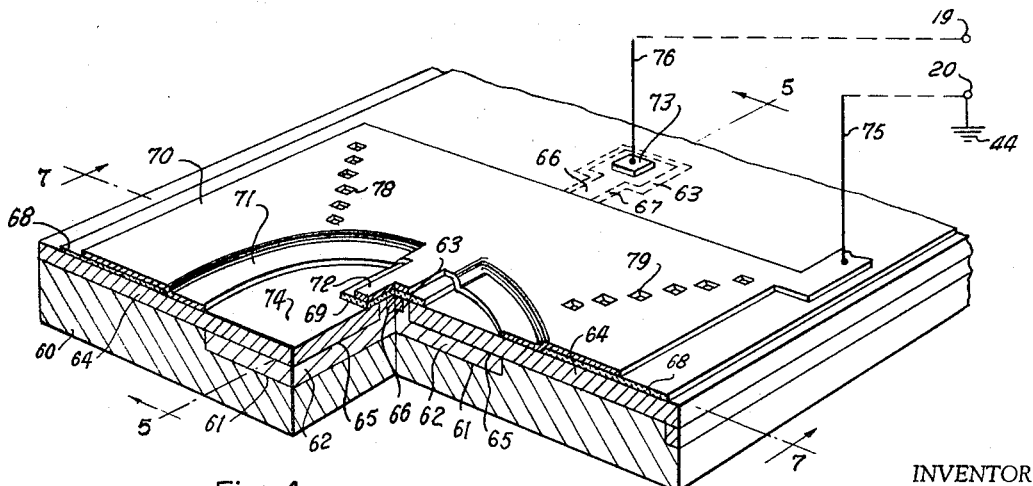
FIGURE 4 is a perspective view of a preferred embodiment of an electrostatically shielded detector according to the invention, which is partly cut away to show an elevational view in section thereof.

The equivalent circuit of the arrangement shown in FIGURES 4 and 5 is shown in the electrical schematic diagram of FIGURE 6, where it can be seen that the distributive capacitance 50 between the signal ground of the light source and the signal portion of the detector has been eliminated for all practical purposes. Actually, a small amount of distributive capacitance 50 still exists but it exists in parallel with capacitance 52, so that all of the distributive capacitance now exists between the signal ground of the light source circuit and the signal ground of the detector circuit. The sheet resistance of the p-type layer 64 which overlies the cathode 62 is sufficiently small that is acts as an electrical short, or nearly enough so, to short out all capacitively coupled signals transferred to it to the original wafer 60 and ground 44.

Because of the complexity of the detector construction, reference is had to FIGURES 7 and 8 which are, respectively, an elevational view in section of the detector of FIGURE 4 taken along section lines 7—7 thereof, and a plan view of the detector. Referring specifically to FIGURE 7, an end view of the narrow channel region 63 is clearly illustrated with the narrower channel 66 disposed therein, which is formed by the diffusion into the channel 63 of an n-type conductivity determining impurity so as to make contact to the n-type region 62. It can be seen that the p-type region 64 extends into the n-region and forms a layer thereover with the exception of the narrow channel region 63. Electrode 70 formed to the p-type region 64 surrounds the n-type region 62 but does not extend thereover, thus leaving a central opening exposing a surface 74 of region 64 so that the optical radiation or light can strike the detector. As noted above, the tab 72 of electrode 70 does overlie channel 63 to complete the electrostatic shielding of the cathode in conjunction with p-type region 64 and wafer 60. As the optical radiation from light source 10 strikes the detector in the central opening, it penetrates into the p-type region 64 overlying the cathode 62, wherein a large portion of the light is absorbed in region 64. The region 64 is sufficiently thin, however, so that the electron-hole pairs generated as the light is absorbed are within a diffusion length of the junction 65 between region 64 and cathode 62. Since junction 65 is a continuation of junction 61, it is equivalent to collecting the carriers at the latter junction to produce the photocurrent. Most of the light that is not absorbed in p-type region 64 is absorbed in the cathode region 62, where the carriers produced thereby are absorbed at one of the junctions 61 and 65.

Referring to the top plan view of FIGURE 8, the p-type diffused region 64 can be seen to cover the entire top of the wafer 60 with the exception of the narrow channel 63. The oxide layer 68 covers the surface of the p-type region 64 with the exception of a central circular opening exposing surface 74 of region 64 and an annular region exposing a portion of region 64 surrounding surface 74, and also includes a tab 69 overextending channel 63. Formed on top of the oxide is the electrode 70 which also defines a central opening exposing the surface 74 but which extends inside of the oxide layer to make contact to the p-type region 64. The electrode 70 also has the tab portion 72 extending into the central opening overextending channel region 63. Formed within the channel 63 is the diffused n+ region 66 which makes contact with the cathode 62. Electrode 73 is formed to the extreme end of n+ region 66 beyond electrode 70 as shown. Small spaced holes 78, 79, 80 and 81 extending radially outward from the central opening are cut in electrode 70, so that when the light source is positioned over the detector, the light source can be centered by counting the number of holes in each line that it does not overlap. When the numbers of exposed holes in the lines are equal, the light source is approximately centered.

It should be pointed out that the light source and detector can be used in conjunction with an integrated network and form a part thereof. Actually, its use in integrated networks is preferred, and a description of such an embodiment is set forth in the copending Merryman application. If this is the case, the detector will normally be fabricated within the network substrate simultaneously with the fabrication of the detector circuit 22. It is customary and expedient to standardize on the various diffusion steps used to minimize the number required. Thus if transistors are fabricated, a collector diffusion is normally carried out initially to form regions of relatively low conductivity. Next, base diffusions are performed at shallower depths but are of higher conductivity to convert the conductivity type of the collector regions. Finally, emitter diffusions are performed at yet shallower depths but of yet higher conductivity. It can be seen from the foregoing figures of the detector that the n-type cathode region would be performed simultaneously with the collector diffusion; the p-type region 64 simultaneously with the base diffusions; and, finally, the n+ channel region 66 simultaneously with the emitter diffusions. Therefore, the depths of these three regions will normally be different as shown in the following FIGURES 9A, A'–9E, E'.

The process by which the detector is fabricated is illustrated in FIGURES 9A, A' through 9E, E', wherein FIGURES 9A–9E are elevational views in section taken across the same section lines as is FIGURE 5 and FIGURES 9A'–9E' are elevational views in section taken across the same section lines as is FIGURE 7. Initially, an n-type conductivity determining impurity is diffused into a p-type wafer 60 to form an n-type conductivity region 62 separated from the wafer by an active junction 61, as shown in FIGURES 9A, A'. This diffusion is made by conventional photographing masking techniques through a hole in an oxide layer 90. During the diffusion of impurities into a semiconductor wafer, oxide is grown over the openings in the oxide mask to form a complete layer of oxide on the surface of the wafer. However, for the sake of clarity, the oxide which is grown during the diffusion process is not shown so that the openings in the oxide mask can be illustrated. After the n-region 62 is formed, another oxide mask 91 is provided on the surface of the wafer and the rest of the oxide is removed so that only a narrow strip of oxide remains on the wafer which extends over a portion of the original wafer 60 and region 62. Then a p-type conductivity determining impurity is diffused into the wafer as shown in FIGURES 9B, B' to surround the n-type region 62 with the p-type region 64 in conjunction with the wafer 60, with the exception of the strip that is masked. This forms a junction 65 between the p-type region 64 and n-type region 62. Subsequently, as shown in FIGURES 9C, C', oxide masks 92 and 93 are formed over the entire wafer with the exception of the narrow strip that was previously masked by the layer of oxide 91, and then an n-type conductivity determining impurity is diffused into this strip to form a heavily concentrated n+ region 66 which extends into and contacts the n-type region 62, but which forms a junction 67 with the wafer 60. Again, an oxide layer is formed over the entire wafer during the diffusion process and, subsequently, an annular opening is cut in the oxide to expose an annular surface of region 64 just outside of and surrounding n-type region 62. A small portion of oxide is also removed which overlies the extreme end of channel 66. Then, a layer of a suitable electrode metal, such as aluminum, for example, is deposited onto the entire surface of the device, whereby the metal layer contacts the annular surface of region 64 and the extreme end of channel 66, all as shown in FIGURES 9D, D'. Finally, portions of the metal layer are selectively removed to expose the p-type region which overlies the n-type region 62, with the exception of tab 72 covering the oxide tab 69 and channel 63, and to separate electrode 70, electrically, from electrode 73, all as shown in FIGURES 9E, E'. The holes 78, 79, 80 and 81 (not shown) are also cut if desired.

Although the invention has been described with reference to a preferred embodiment thereof, certain modifications and substitutions that do not depart from the true scope of the invention will undoubtedly occur to those skilled in the art. Therefore, it is intended that the invention be limited only as defined in the appended claims.

What is claimed is:
1. An optoelectronic device comprising:
 (a) a first semiconductor device for being interconnected with an electrical load and containing an active rectifying junction defining the active signal portion of said first device from the remaining portions of said first device for delivering a first signal to said load in response to a current flow across said active junction,
 (b) said first device generating said current flow in response to optical radiation being absorbed therein to generate charge carriers which are collected at said active junction,
 (c) a second device optically coupled to said first device for generating optical radiation directed on said first device in response to an electrical signal applied to said second device,
 (d) said radiation generated by said second device having a wavelength such that at least a portion thereof is absorbed within said first device to generate charge carriers which are collected at said active junction, and
 (e) said remaining portions of said first device substantially surrounding and enclosing said signal portion of said first semiconductor device to electrostatically shield said signal portion from said second device to substantially reduce any distributed capacitance that would otherwise exist between said second device and said active signal portion of said first device.

2. An optoelectronic device according to claim 1 wherein said second device comprises a semiconductor device having a rectifying junction, and generates said optical radiation in response to a forward current flow across the junction thereof.

3. An optoelectronic device comprising:
 (a) a first semiconductor diode defining first and second regions of first and second conductivity types, respectively, separated by a rectifying junction,
 (b) said first region being substantially enclosed by said second region,
 (c) said diode defining a third region of said first conductivity type extending through portions of both said first and said second regions and making electrical contact with said first region,
 (d) an electrode attached to said third region, and
 (e) a light source disposed adjacent said diode for generating optical radiation directed on said diode.

4. An optoelectronic device according to claim 3 wherein said light source comprises another semiconductor diode for generating said optical radiation in response to a forward current flow across the junction thereof.

5. An optoelectronic device according to claim 4 including an optically transparent solid medium disposed between said diode and said light source.

6. An optoelectronic device comprising:
 (a) a detector comprising a first body of semiconductor material having first and second electrodes attached thereto,
 (b) said first body comprising
  (i) a first region of first conductivity type defining an exposed surface of said body and being connected to said first electrode,
  (ii) a second region of a second conductivity type defining a first portion underlying said first electrode and a second portion connected to said second electrode, (iii) a third region of said second conductivity type of which a portion underlies a part of said first region which defines said exposed surface and forming a rectifying junction therewith, and the rest of which underlies a part of said second region underlying said first electrode and making electrical contact therewith, and (iv) a fourth region of said first conductivity type defining portions adjacent said second and said third regions and forming a continuation of said rectifying junction therewith, and a portion adjacent said first region making electrical contact therewith, and (c) a light source comprising a second body of semiconductor material having third and fourth electrodes attached thereto and disposed adjacent said first body overlying said exposed surface, (d) said second body comprising
(i) a first region of said first conductivity type connected to said first electrode, and
(ii) a second region of said second conductivity type adjacent said first region and forming a rectifying junction therewith and connected to said second electrode, (e) said light source generating optical radiation directed on said exposed surface in response to a forward current flow across the rectifying junction thereof.

7. An optoelectronic device according to claim 6 including electrical isolation means disposed between said first portion of said second region of said first body and said first electrode.

8. An optoelectronic device according to claim 6 including an optically transparent, solid medium separating said detector and said light source.

9. An optoelectronic device according to claim 6 wherein said optical radiation has a wavelength such that at least a portion thereof is absorbed within said detector to generate charge carriers which are collected at said rectifying junction in said detector.

10. An optoelectronic device according to claim 6 wherein said first body is comprised of silicon, said first and said fourth regions of said first body are p-type conductivity, said second and said third regions of said first body are n-type conductivity, said second body is comprised substantially of gallium-arsenide, said first region of said second body is p-type conductivity, and said second region of said second body is n-type conductivity and is disposed between said first region of said second body and said detector.

11. A semiconductor device comprising:
(a) first and second regions of first and second conductivity types, respectively, separated by a rectifying junction,
(b) said first region being substantially enclosed by said second region,
(c) a third region of said first conductivity type extending through portions of both said first and said second regions and making electrical contact with said first region, and
(d) first and second electrodes connected to said first and third regions, respectively.

12. A semiconductor device comprising:
(a) a body of semiconductor material having first and second electrodes attached thereto,
(b) said body comprising
(i) a first region of first conductivity type defining an exposed surface of said body and being connected to said first electrode,
(ii) a second region of a second conductivity type defining a first portion underlying said first electrode and a second portion connected to said second electrode,
(iii) a third region of said second conductivity type of which a portion underlies a part of said first region which defines said exposed surface and forming a rectifying junction therewith, and the rest of which underlies a part of said second region underlying said first electrode and making electrical contact therewith, and
(iv) a fourth region of said first conductivity type defining portions adjacent said second and said third regions and forming a continuation of said rectifying junction therewith, and a portion adjacent said first region making electrical contact therewith.

13. A semiconductor device according to claim 12 including electrical isolation means disposed between said first portion of said second region and said first electrode.

14. A semiconductor device according to claim 12 wherein said body is comprised of silicon, said first and said fourth regions are p-type conductivity, and said second and said third regions are n-type conductivity.

15. An optoelectronic device comprising:
(a) a first semiconductor device for interconnection with an electrical load and containing an active rectifying junction defining the active signal portion of said first device from the remaining portions of said first device for delivering a first signal to said load in response to a current flow across said active junction, said first device generating said current flow in response to optical radiation being absorbed therein to generate charge carriers which are collected at said active junction,
(b) means for making electrical contact to said remaining portions of said first device,
(c) a second device optically coupled to said first device for generating optical radiation directed on said first device in response to an electrical signal applied to said second device, said radiation generated by said second device having a wavelength such that at least a portion thereof is absorbed within said first device to generate charge carriers which are collected at said active junction, and
(d) said remaining portions of said first device and said means for making electrical contact to said remaining portions surrounding and enclosing said signal portion of said first semiconductor device to electrostatically shield said signal portion from said second device to substantially reduce any distributed capacitance that would otherwise exist between said second device and said active signal portion of said first device.

References Cited

UNITED STATES PATENTS

| | | | |
|---|---|---|---|
| 2,779,877 | 1/1957 | Lehovec | 250—211 |
| 2,907,969 | 10/1959 | Seidenstriker. | |
| 3,304,430 | 2/1967 | Biard et al. | |
| 1,865,065 | 6/1932 | Van der Pol et al. | 313—239 |
| 2,776,367 | 1/1957 | Lehovec | 250—211 |
| 3,090,873 | 5/1963 | Mackintosh. | |

RALPH G. NILSON, *Primary Examiner.*

MARTIN ABRAMSON, *Assistant Examiner.*

250—217; 317—235